US011014290B2

(12) United States Patent
Tyler et al.

(10) Patent No.: US 11,014,290 B2
(45) Date of Patent: May 25, 2021

(54) ADDITIVE MANUFACTURING SYSTEM HAVING AUTOMATED REINFORCEMENT THREADING

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 512 days.

(21) Appl. No.: 15/860,260

(22) Filed: Jan. 2, 2018

(65) Prior Publication Data

US 2018/0207864 A1    Jul. 26, 2018

Related U.S. Application Data

(60) Provisional application No. 62/449,899, filed on Jan. 24, 2017.

(51) Int. Cl.
  *B29C 64/118* (2017.01)
  *B29C 64/165* (2017.01)
  (Continued)

(52) U.S. Cl.
  CPC ............ *B29C 64/118* (2017.08); *B29C 48/05* (2019.02); *B29C 48/08* (2019.02); *B29C 48/12* (2019.02);
  (Continued)

(58) Field of Classification Search
  CPC ... B29C 64/165; B29C 64/245; B29C 64/124; B29C 70/24; B29C 48/08; B29C 48/30; B29C 48/35; B29C 48/305
  See application file for complete search history.

(56) References Cited

U.S. PATENT DOCUMENTS 3,286,305 A   11/1966   Seckel
3,809,514 A   5/1974   Nunez
(Continued)

FOREIGN PATENT DOCUMENTS

DE   4102257 A1   7/1992
EP   2589481 B1   1/2016
(Continued)

OTHER PUBLICATIONS

International Search Report dated Apr. 17, 2018 for PCT/US2018/013044 to CC3D LLC Filed Jan. 10, 2018.
(Continued)

*Primary Examiner* — Timohty Kennedy
*Assistant Examiner* — Olukorede Esan
(74) *Attorney, Agent, or Firm* — Ryan C. Stockett

(57) ABSTRACT

An additive manufacturing system is disclosed. The additive manufacturing system may include a moveable support, and a print head connected to the moveable support. The print head may be configured to discharge a continuous reinforcement that is wetted with a liquid matrix. The additive manufacturing system may also include an auto-threader configured to thread the continuous reinforcement through the print head, and a controller in communication with the moveable support, the print head, and the auto-threader. The controller may be configured to selectively activate the auto-threader at a start of a manufacturing process.

25 Claims, 3 Drawing Sheets

(51) Int. Cl.

| | |
|---|---|
| *B33Y 10/00* | (2015.01) |
| *B33Y 30/00* | (2015.01) |
| *B29C 64/124* | (2017.01) |
| *B33Y 70/10* | (2020.01) |
| *B29C 48/30* | (2019.01) |
| *B29C 64/135* | (2017.01) |
| *B29C 64/209* | (2017.01) |
| *B29C 64/371* | (2017.01) |
| *B29C 48/08* | (2019.01) |
| *B29C 48/35* | (2019.01) |
| *B29C 48/305* | (2019.01) |
| *B29C 64/245* | (2017.01) |
| *B29C 70/24* | (2006.01) |
| *B29C 70/38* | (2006.01) |
| *B29C 64/129* | (2017.01) |
| *B29C 70/68* | (2006.01) |
| *B29C 48/12* | (2019.01) |
| *B29C 48/05* | (2019.01) |
| *B29C 64/386* | (2017.01) |
| *B29C 64/277* | (2017.01) |
| *B29C 64/282* | (2017.01) |
| *B33Y 40/20* | (2020.01) |
| *B33Y 50/02* | (2015.01) |
| *B33Y 70/00* | (2020.01) |
| *B29C 64/214* | (2017.01) |
| *B29C 64/264* | (2017.01) |
| *B29C 64/393* | (2017.01) |
| *B29C 64/106* | (2017.01) |
| *B29C 64/336* | (2017.01) |
| *B29C 70/06* | (2006.01) |
| *B29C 64/218* | (2017.01) |
| *B29K 105/10* | (2006.01) |
| *B29K 105/00* | (2006.01) |
| *B22F 7/06* | (2006.01) |
| *B29C 33/00* | (2006.01) |
| *B22F 10/10* | (2021.01) |
| *B33Y 80/00* | (2015.01) |
| *B22F 3/10* | (2006.01) |
| *B22F 3/11* | (2006.01) |
| *B29C 64/227* | (2017.01) |
| *B29K 105/08* | (2006.01) |
| *B33Y 40/00* | (2020.01) |
| *B29B 15/12* | (2006.01) |

(52) U.S. Cl.
CPC ............ *B29C 48/30* (2019.02); *B29C 48/305* (2019.02); *B29C 48/35* (2019.02); *B29C 64/106* (2017.08); *B29C 64/124* (2017.08); *B29C 64/129* (2017.08); *B29C 64/135* (2017.08); *B29C 64/165* (2017.08); *B29C 64/209* (2017.08); *B29C 64/214* (2017.08); *B29C 64/218* (2017.08); *B29C 64/245* (2017.08); *B29C 64/264* (2017.08); *B29C 64/277* (2017.08); *B29C 64/282* (2017.08); *B29C 64/336* (2017.08); *B29C 64/371* (2017.08); *B29C 64/386* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 40/20* (2020.01); *B33Y 50/02* (2014.12); *B33Y 70/00* (2014.12); *B33Y 70/10* (2020.01); *B22F 3/1035* (2013.01); *B22F 3/1118* (2013.01); *B22F 7/06* (2013.01); *B22F 10/10* (2021.01); *B22F 2999/00* (2013.01); *B29B 15/122* (2013.01); *B29C 64/227* (2017.08); *B29C 2033/0005* (2013.01); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0121712 A1* | 9/2002 | Schroeder ............... B29C 70/50 264/40.1 |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2005/0261464 A1* | 11/2005 | Schorr ................. C08K 5/0025 528/272 |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |

(56) References Cited

U.S. PATENT DOCUMENTS

| | | |
|---|---|---|
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1* | 3/2014 | Tyler ............... B33Y 50/02 264/401 |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0165666 A1 | 6/2015 | Butcher et al. |
| 2015/0375457 A1* | 12/2015 | Mark ............... B29C 67/0088 425/166 |
| 2016/0012935 A1 | 1/2016 | Rothfuss |
| 2016/0031155 A1 | 2/2016 | Tyler |
| 2016/0046082 A1* | 2/2016 | Fuerstenberg ......... B29C 70/30 264/480 |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(56) References Cited

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

ADDITIVE MANUFACTURING SYSTEM HAVING AUTOMATED REINFORCEMENT THREADING

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a manufacturing system and, more particularly, to an additive manufacturing system having automated reinforcement threading.

BACKGROUND

Continuous fiber 3D printing (a.k.a., CF3D™) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although continuous fiber 3D printing provides for increased strength, compared to manufacturing processes that do not utilize continuous fiber reinforcement, setup associated with the process can be complex and/or time-consuming. For example, threading of the fiber(s) through the print head has historically been a manual process involving a narrow hook placed in reverse direction up through a nozzle of the print head. The hook is then attached to the fiber, and pulled back out through the nozzle. This can be difficult when using stiff reinforcements (e.g., prepreg fibers, wires, etc.), and even more time consuming when using more flexible fibers (e.g., dry fibers).

The disclosed system is directed at addressing one or more of the problems set forth above and/or other problems of the prior art.

SUMMARY

In one aspect, the present disclosure is directed to an auto-threader for an additive manufacturing system. The auto-threader may include a first set of rollers, and a second set of rollers. The auto-threader may also include a resin jet disposed between the first and second sets of rollers, and a cure enhancer located downstream of the resin jet.

In another aspect, the present disclosure is directed to a print head for an additive manufacturing system. The print head may include a matrix reservoir, a nozzle fluidly connected to the matrix reservoir, and a primary cure enhancer located downstream of the nozzle. The print head may further include an auto-threader located upstream of the nozzle.

In yet another aspect, the present disclosure is directed to an additive manufacturing system. The additive manufacturing system may include a moveable support, and a print head connected to the moveable support. The print head may be configured to discharge a continuous reinforcement that is wetted with a liquid matrix. The additive manufacturing system may further include an auto-threader configured to thread the continuous reinforcement through the print head, and a controller in communication with the moveable support, the print head, and the auto-threader. The controller may be configured to selectively activate the auto-threader at a start of a manufacturing process.

In yet another aspect, the present disclosure is directed to a method of additively manufacturing a composite structure. The method may include creating a taut section in a continuous reinforcement passing through a print head, and selectively spraying resin onto the taut section in the continuous reinforcement. The method may also include selectively directing cure energy toward the resin sprayed onto the taut section in the continuous reinforcement.

DETAILED DESCRIPTION

Figure 1:
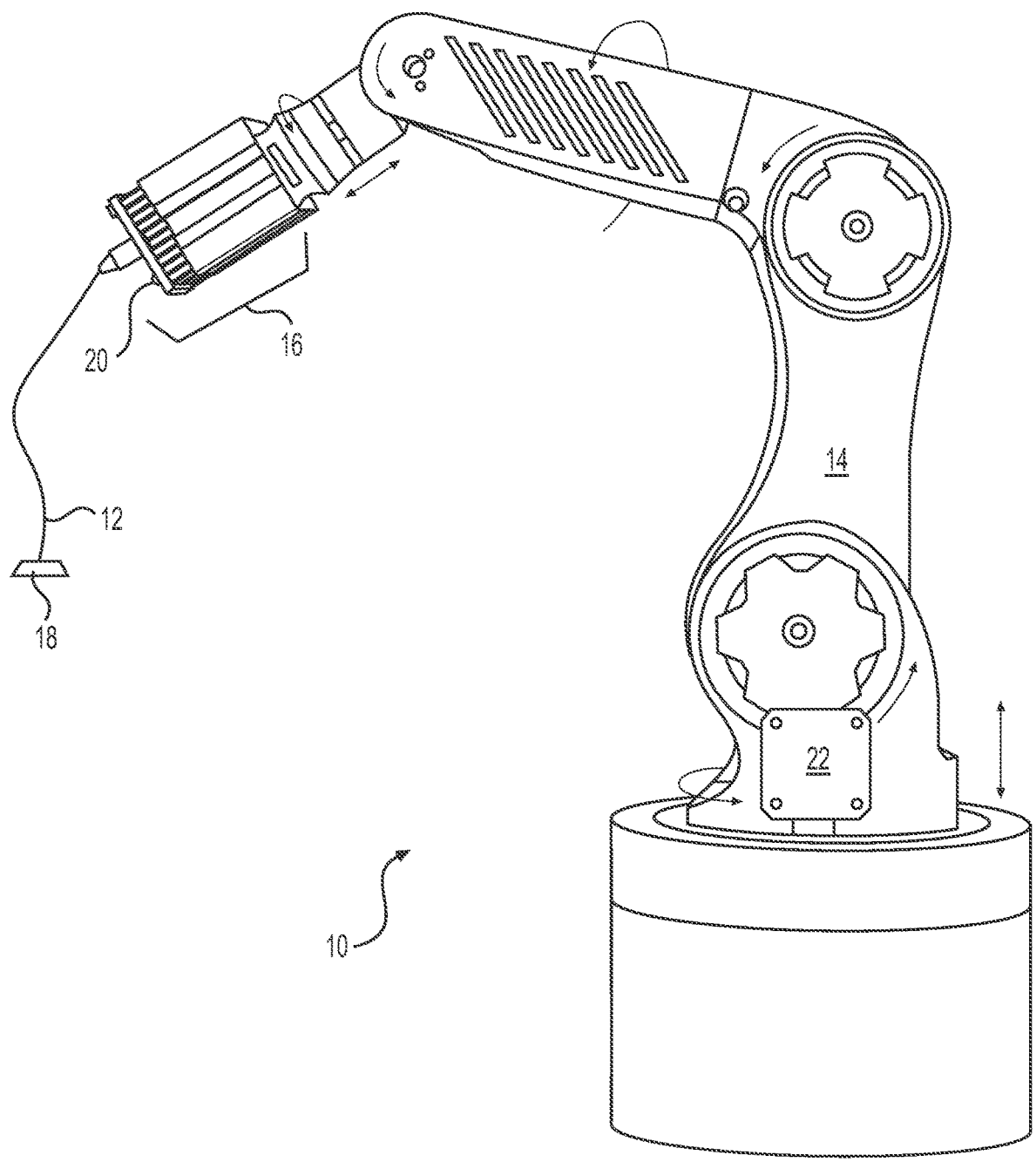
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., on and/or trailing from) head 16 and configured to enhance a cure rate and/or quality of the matrix as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Figure 2:
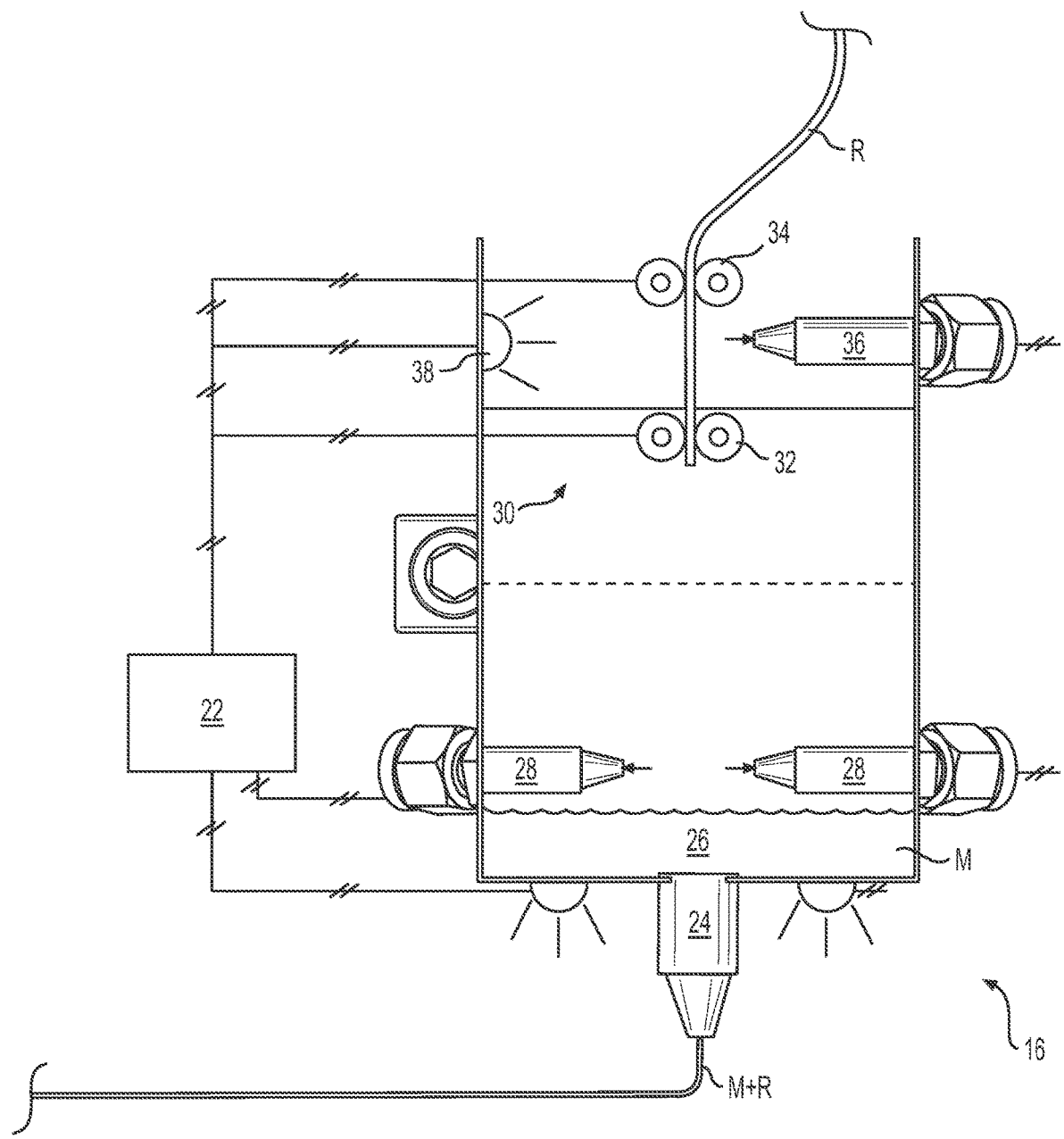
FIG. 2 is a diagrammatic illustration of an exemplary disclosed print head that may be utilized with the manufacturing system of FIG. 1.

An exemplary head 16 is disclosed in detail in FIG. 2. Head 16 may include, among other things, one or more nozzles 24 that are fluidly connected to the lower end of a matrix reservoir 26. Any number of reinforcements (represented as R in FIG. 2) may be received at an opposing upper end of reservoir 26, passed axially through reservoir 26 where at least some matrix-impregnation occurs (matrix represented as M in FIG. 2), and discharged from head 16 via any number of separate nozzles 24. In the disclosed embodiment, a single nozzle 24 is utilized that has a straight axial or convergent tip. In multi-nozzle applications, however, it may be helpful for a tip of each nozzle 24 to have a divergent shape to facilitate coalescing of the different matrix-coated fibers into a ribbon or sheet of composite material.

Multiple options exist for wetting of the reinforcement(s) with the matrix. In one example, the reinforcements are at least partially coated with the matrix during passage of the reinforcements through a bath inside of matrix reservoir 26. In other example, one or more jets 28 may be selectively activated (e.g., by controller 22) to spray the reinforcement(s) with matrix during passage through matrix reservoir 26. It is contemplated that a combination of these technologies, and others, may be employed, as desired.

In some situations, it may be difficult to load head 16 with the reinforcements, as some reinforcements may lack the rigidity required to be pushed from the upper end of matrix reservoir 26 through a tip end of nozzle 24. FIG. 2 illustrates one way that loading of head 16 may be simplified. Specifically, an auto-threader 30 may be attached to or otherwise integrated into head 16.

Auto-threader 30 may include, among other things, a first or downstream set of rollers 32 that are separated from a second or upstream set of rollers 34, at least one resin jet 36 that is disposed axially between rollers 32 and rollers 34, and an auxiliary cure enhancer 38 that is located adjacent or downstream of resin jet 36. With this configuration, as a fiber tip of a reinforcement is placed into head 16, rollers 34 of auto-threader 30 may be cause to counter-rotate (e.g., automatically by controller 22 or in response to a manual input) and draw in the reinforcement. The reinforcement may be passed from rollers 34 toward rollers 32, which may also be counter-rotating at this time. At a point in time after rollers 32 engage and grasp the reinforcement, rollers 34 may stop rotating and/or counter-rotate in a reverse direction, such that the reinforcement is pulled taut between the two sets of rollers 32, 34. Thereafter, resin jet 36 may be activated (e.g., automatically by controller 22 and/or in response to manual input) to spray resin (e.g., the same matrix contained within matrix reservoir 26 or a different resin) onto the taut and straightened reinforcement. This may be followed by activation of auxiliary cure enhancer 38, to cause the resin to cure and thereby create a hardened straight section (e.g., a needlepoint) at the free end of the reinforcement. Rollers 34 may then release the reinforcement, while rollers 32 advance the needlepoint through nozzle 24. It should be noted that a length of the needlepoint (and a corresponding distance between rollers 32 and rollers 32) should be at least as long as a distance from rollers 32 through nozzle 24. It should also be noted that a bath (not shown) could be used instead of or in addition to jet 36, if desired).

Figure 5:
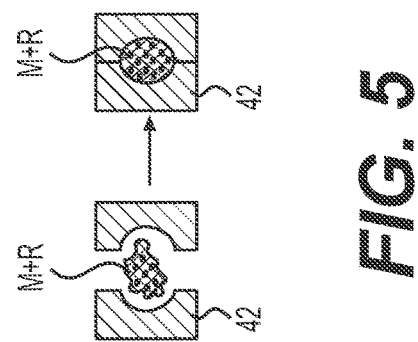
FIG. 5 is a cross-sectional illustration of an exemplary auto-threader that may be used in conjunction with the print heads of FIGS. 2-4.
Figure 4:
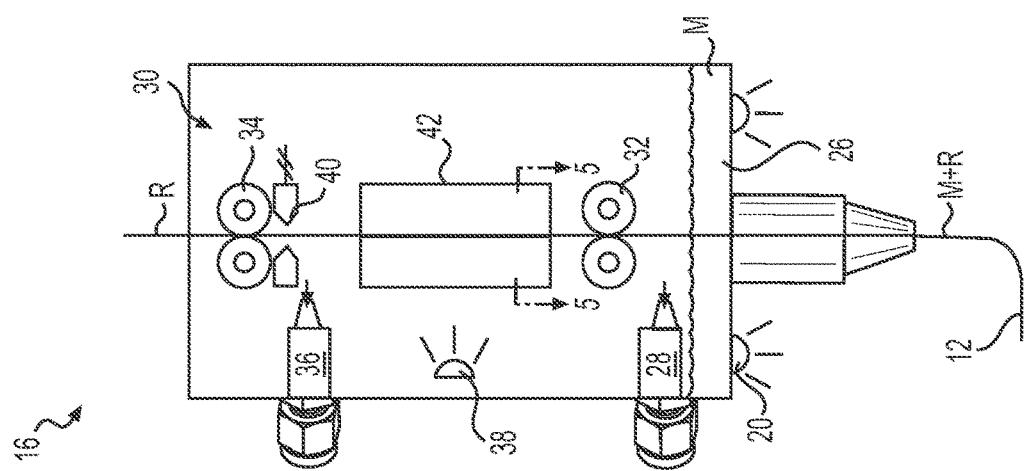
FIGS. 3 and 4 are diagrammatic illustrations of another exemplary disclosed print head that may be used in conjunction with the manufacturing system of FIG. 1.
Figure 3:
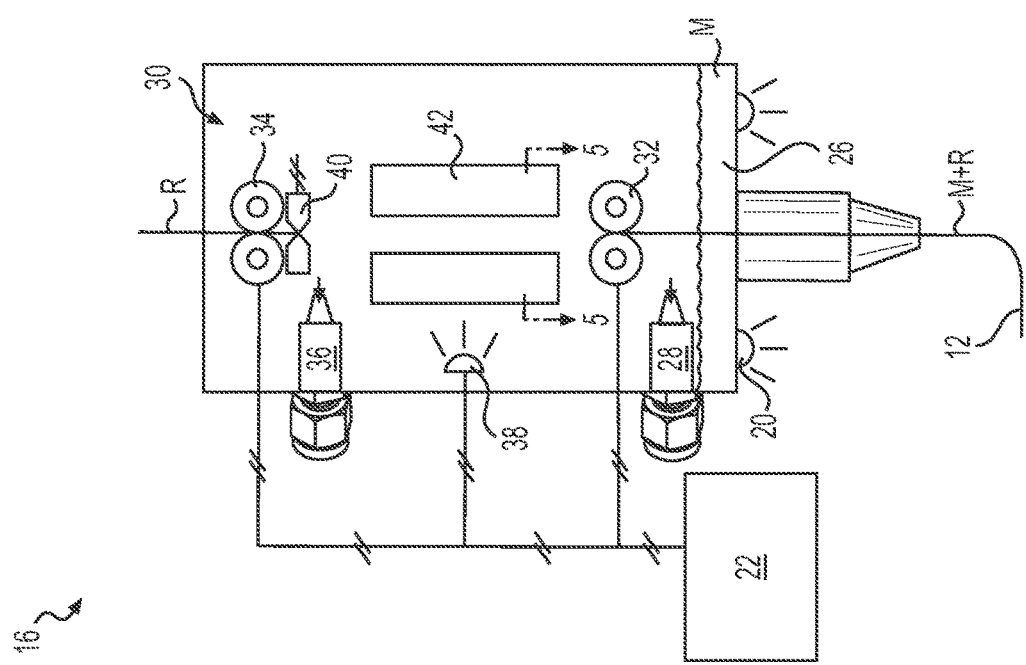

Another way to load head 16 with reinforcements is illustrated in FIG. 3. As shown in this figure, head 16 may be capable of internally severing the reinforcements (e.g., at the completion of a track or layer of structure 12), and automatically restarting a new track, layer, and/or print. In particular, head 16 may include a severing mechanism 40 located axially between rollers 32 and rollers 32, and a bead mold 42 that is at least partially transparent and located upstream or downstream of severing mechanism 40. Controller 22 may be in communication with each of these components and configured to selectively actuate severing mechanism 40 at a desired endpoint, after which head 16 may be moved away to a new starting point without discharging a significant length of the reinforcements. At about this time (e.g., just before or just after reinforcement severing), resin jet 36 may be caused to spray resin onto a portion of the reinforcements, which may thereafter be advanced by rollers 34 through bead mold 42 and into rollers 32. As the reinforcements pass into bead mold 42, bead mold 42 may be caused to close around (shown in FIG. 5) and/or compress the resin-wetted reinforcement. During this operation, auxiliary cure enhancer 38 may be selectively activated to pass energy through bead mold 42 and cause at least partial curing of the resin. The partial curing of the resin on the reinforcements inside of bead mold 42 may allow for bead mold 42 to shape and harden the material (e.g., into a straightened needlepoint having any desired cross-section) for easier threading through nozzle 24. It should be noted that severing mechanism 40 (or another similar mechanism) could be used to shape the needlepoint (e.g., by cutting at an angle relative to an axis of the reinforcement) in addition to severing the reinforcement, if desired.

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed auto-threader may allow for simplified and resource-conserving setup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 26, and then threading the reinforcements through any nozzles 24 that exist. Although this process may be completed manually, auto-threader 30 may reduce a complexity and/or time consumed during setup. As described above, auto-threader 30 may receive a loose end of the reinforcement, pull the reinforcement taut between rollers 32 and 34, at least partially coat the taut reinforcement with resin, harden the resin via exposure to cure energy from auxiliary cure enhancer 38, and then push the resulting needle through nozzle 24. In some embodiments, bead mold 42 may be used to shape the needle.

Installation of the matrix may include filling reservoir 26 within head 16 and/or coupling of an extruder (not shown) to head 16. Head 16 may then be moved by support 14 under the regulation of controller 22 to cause matrix-coated reinforcements to be placed against or on a corresponding anchor point 18. Cure enhancers 20 within head 16 may then be selectively activated to cause hardening of the matrix surrounding the reinforcements, thereby bonding the reinforcements to anchor point 18.

The component information may then be used to control operation of system 10. For example, the reinforcements may be pulled and/or pushed from head 16 (along with the matrix), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may be pushed and/or pulled through nozzle 24. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A method of additively manufacturing a composite structure, comprising:
    creating a taut section in a continuous reinforcement at a location inside of a print head;
    selectively spraying thermoset resin onto the taut section in the continuous reinforcement;
    and selectively hardening the thermoset resin on the taut section at the location inside of the print head.

2. The method of claim 1, further including shaping a cross-section of the taut section in the continuous reinforcement after selectively spraying thermoset resin and prior to hardening the thermoset resin.

3. The method of claim 1, wherein, only after the thermoset resin is hardened at the location inside of the print head, the method further includes pushing the taut section in the continuous reinforcement through a nozzle of the print head.

4. The method of claim 3, further including:
    wetting the continuous reinforcement in liquid matrix;
    discharging the continuous reinforcement and liquid matrix through the nozzle; and
    directing cure energy toward the liquid matrix wetting the continuous reinforcement after discharge from the nozzle.

5. The method of claim 4, wherein the thermoset resin is substantially identical to the liquid matrix.

6. The method of claim 4, further including severing the continuous reinforcement, wherein creating the taut section includes creating the taut section only after the severing has been completed.

7. The method of claim 4, further including moving the print head in multiple dimensions during the discharging.

8. The method of claim 1, wherein selectively hardening the thermoset resin includes exposing the thermoset resin to the cure energy is light.

9. The method of claim 2, wherein:
    shaping the taut section includes closing a bead mold around the taut section; and
    selectively directing cure energy toward exposing the thermoset resin to light includes directing the light cure energy through the bead mold.

10. A method of additively manufacturing a composite structure, comprising:
    passing a dry continuous reinforcement into a print head;
    creating a taut section in the dry continuous reinforcement at a location inside of the print head;
    selectively wetting only the taut section of the dry continuous reinforcement with a resin at the location inside of the print head to create a wet continuous reinforcement;
    selectively directing cure energy toward the wet continuous reinforcement at the location inside of the print head; and
    shaping a cross-section of the wet continuous reinforcement at the location inside of the print head.

11. The method of claim 10, wherein shaping the taut section of the wet continuous reinforcement includes forming the wet continuous reinforcement into a straight needle prior to selectively directing cure energy toward the wet continuous reinforcement.

12. The method of claim 11, wherein shaping the taut section includes closing a bead mold around the taut section.

13. The method of claim 12, wherein selectively directing cure energy toward the wet continuous reinforcement includes directing the cure energy through the bead mold.

14. The method of claim 10, wherein:
    passing the dry continuous reinforcement into the print head includes pulling the dry continuous reinforcement through the print head during a normal discharging operation; and
    only after the cure energy is directed toward the wet continuous reinforcement, the method further includes pushing the taut section of the wet continuous reinforcement through a nozzle of the print head.

15. The method of claim 14, further including:
    wetting a remaining portion of the dry continuous reinforcement with liquid matrix;
    discharging the remaining portion through the nozzle of the print head; and
    directing cure energy toward the liquid matrix at a location outside of the print head.

16. The method of claim 15, wherein the resin is substantially identical to the liquid matrix.

17. The method of claim 15, further including severing the remaining portion of the dry continuous reinforcement, wherein creating the taut section includes creating the taut section only after the severing has been completed.

18. The method of claim 15, further including moving the print head in multiple dimensions during the discharging of the remaining portion.

19. The method of claim 10, wherein the cure energy is light.

20. A method of additively manufacturing a composite structure, comprising:
    pulling a continuous reinforcement through a nozzle of a print head during normal discharging;
    selectively wetting the continuous reinforcement with a liquid matrix at a location inside of the print head during the pulling;
    hardening the liquid matrix wetting the continuous reinforcement at a location outside of the print head; and selectively pushing the continuous reinforcement through the nozzle of the print head only during threading of the print head.

21. The method of claim 20, further including:

selectively hardening the liquid matrix wetting the continuous reinforcement at a location inside of the print head; and closing a bead mold around the reinforcement inside of the print head to shape a cross-section of the continuous reinforcement for the threading.

22. The method of claim 21, wherein selectively hardening the liquid matrix includes directing cure energy through the bead mold.

23. The method of claim 20, wherein the liquid matrix is a UV-curable thermoset.

24. The method of claim 20, pulling the continuous reinforcement through the nozzle of the print head includes moving the print head away from a point at which the continuous reinforcement is anchored.

25. The method of claim 20, wherein the the liquid matrix is uncured when being pulled from the nozzle and cured when being pushed from the nozzle.

* * * * *